United States Patent [19]

Larkin et al.

[11] Patent Number: 4,849,581

[45] Date of Patent: Jul. 18, 1989

[54] ADJUSTABLE JOINT FOR ELECTRICAL BUSWAY

[75] Inventors: Harold F. Larkin, Plainville; David A. Hibbert, South Windsor; Julie A. Beberman, New Hartford, all of Conn.; Clarence W. Walker, Selmer, Tenn.

[73] Assignee: General Electric Company, New York, N.Y.

[21] Appl. No.: 194,655

[22] Filed: May 16, 1988

[51] Int. Cl.[4] ..................... H01R 13/20; H02G 15/08
[52] U.S. Cl. ................. 174/88 B; 174/68.2; 439/210; 439/213
[58] Field of Search .......................... 174/68 B, 88 B; 439/210, 212, 213

[56] References Cited

U.S. PATENT DOCUMENTS

| 3,009,011 | 11/1961 | Fisher | 174/88 B |
| 3,365,537 | 1/1968 | Fehr, Jr. et al. | 174/88 B |
| 3,489,846 | 1/1970 | Fehr, Jr. | 174/88 B |
| 3,559,148 | 1/1971 | Hafer | 439/213 |
| 3,609,215 | 9/1971 | Giger, Jr. | 174/88 B |
| 3,786,394 | 1/1974 | Koenig et al. | 439/213 |
| 3,922,053 | 11/1975 | Hafer | 174/68.2 X |
| 4,705,334 | 11/1987 | Slicer et al. | 439/210 |

*Primary Examiner*—Morris H. Nimmo
*Attorney, Agent, or Firm*—Richard A. Menelly; Walter C. Bernkopf; Fred Jacob

[57] ABSTRACT

The outer surfaces of adjoining electrical busway side frames are shaped to define a protruding rail extending along the vertical axis thereof. A pair of recessed channels formed within the inner surfaces of the side frames of an intervening busway joint receive the busway rails at opposing ends thereof. Clearance arranged within the respective busway joint channels allows lateral movement of the busway side frames relative to the busway joint. Slots are provided on the busway joint side frames for visual indication of the position of the busway rails.

30 Claims, 4 Drawing Sheets

ADJUSTABLE JOINT FOR ELECTRICAL BUSWAY

BACKGROUND OF THE INVENTION

Long extents of rectangular electrical bus bars are arranged within electrical busway sections for transporting multi-phase high current electric power through industrial establishments. One example of a thermally efficient electrical busway section is described within U.S. Pat. Ser. No. 122,863 filed Nov. 19, 1987 and entitled "Thermally Efficient Power Busway Housing". This Application is incorporated herein for reference purposes and should be reviewed for its description of the arrangement of the electrical bus bars within the busway housing.

U.S. Pat. Application Ser. No. 193,000 filed May 12, 1988 entitled "Thermally Efficient Splice Joint for Electrical Distribution Busway" describes a bolted busway joint wherein the splice plates within the joint are arranged for providing accurate spacing to receive the individual bus bars of adjoining busway systems. This Application is also incorporated herein for reference purposes.

When attempting to interconnect or disconnect between a pair of existing busway sections by means of a self-contained busway joint, some expansion clearance is necessary to compensate for variations in the position of the respective busway sections. One method of compensation, such as described within U.S. Pat. No. 3,559,148, utilizes horizontal slots on the sides of the busway sections with screws attached to the joint side walls. When the joint is inserted between adjacent slotted busway sections, the screws are moved within the slots to provide the necessary adjustment.

U.S. Pat. No. 3,489,846 discloses electric busway joints having similar slotted means for allowing thermal expansion of the busway sections.

One purpose of the instant invention therefore is to provide means on adjacent busway sections, integrally formed therein, for cooperating with integrally formed means on the busway joint to provide adjustment between the adjacent busway sections and the intervening busway joint to compensate for variation between the actual total length of a busway run and the planned total length of the busway run.

SUMMARY OF THE INVENTION

The invention comprises the combination of adjacent electric busway sections and an intervening adjustable busway connecting joint (hereafter "Busway Joint"). One end of each of the electric busway side frames is integrally formed to provide outwardly extending rails aligned in the vertical plane. Both ends of the busway joint side frames are integrally formed to provide inwardly projecting channels running in the same vertical plane. The busway rails are received within the joint channels during interconnection to allow adjustable motion between the busway sections. The joint channels are slotted to indicate the position of the busway rails contained therein as well as to allow the busway insertion of a tool to assist in the adjustment of the busway rails.

DESCRIPTION OF THE PREFERRED EMBODIMENT

Figure 1:
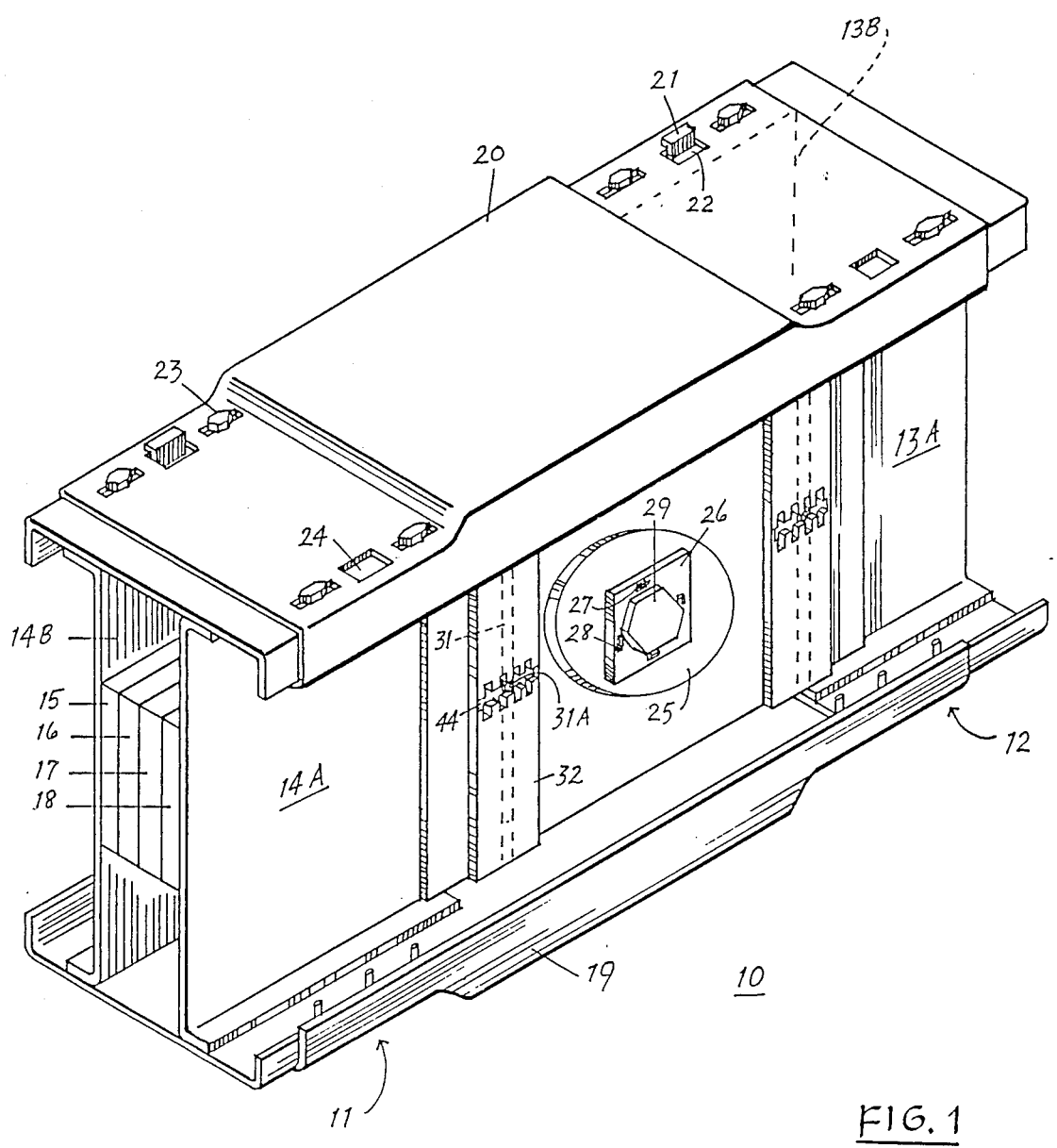
FIG. 1 is a front perspective view of an adjustable electrical busway joint according to the invention.

The busway joint 10, according to the invention is depicted in FIG. 1 attached to adjoining electrical busway sections 11 and 12. Electrically conducting bus bars 15-18 are depicted within busway section 11 between opposing side plates 14A, 14B. Similar bus bars are contained within busway section 12 and are arranged between similar opposing side plates 13A, 13B. The busway joint is fastened between the adjoining busway section by means of a thru-bolt 29 which extends through a rectangular washer 26 and a Belville washer 25. The rectangular washer is kept from rotating by means of slots 27 formed in the rectangular washer and tabs 28, extending from the face plate of the busway joint. The busway joint is enclosed at the bottom by means of a bottom cover 19 and at the top by means of a top cover 20. The top cover 20 includes slots 22 through which upstanding tabs 21 formed on the busway section side plates 13A, 13B and 14A, 14B extend. Slots 24 are similarly formed within the top cover 20 to receive corresponding bolts 23 which extend down through the slots and threadingly connect with the busway sections in a similar manner. As described in aforementioned U.S. Pat. No. 3,489,846, the slots provide expansion accommodation for thermal purposes.

Figure 2:
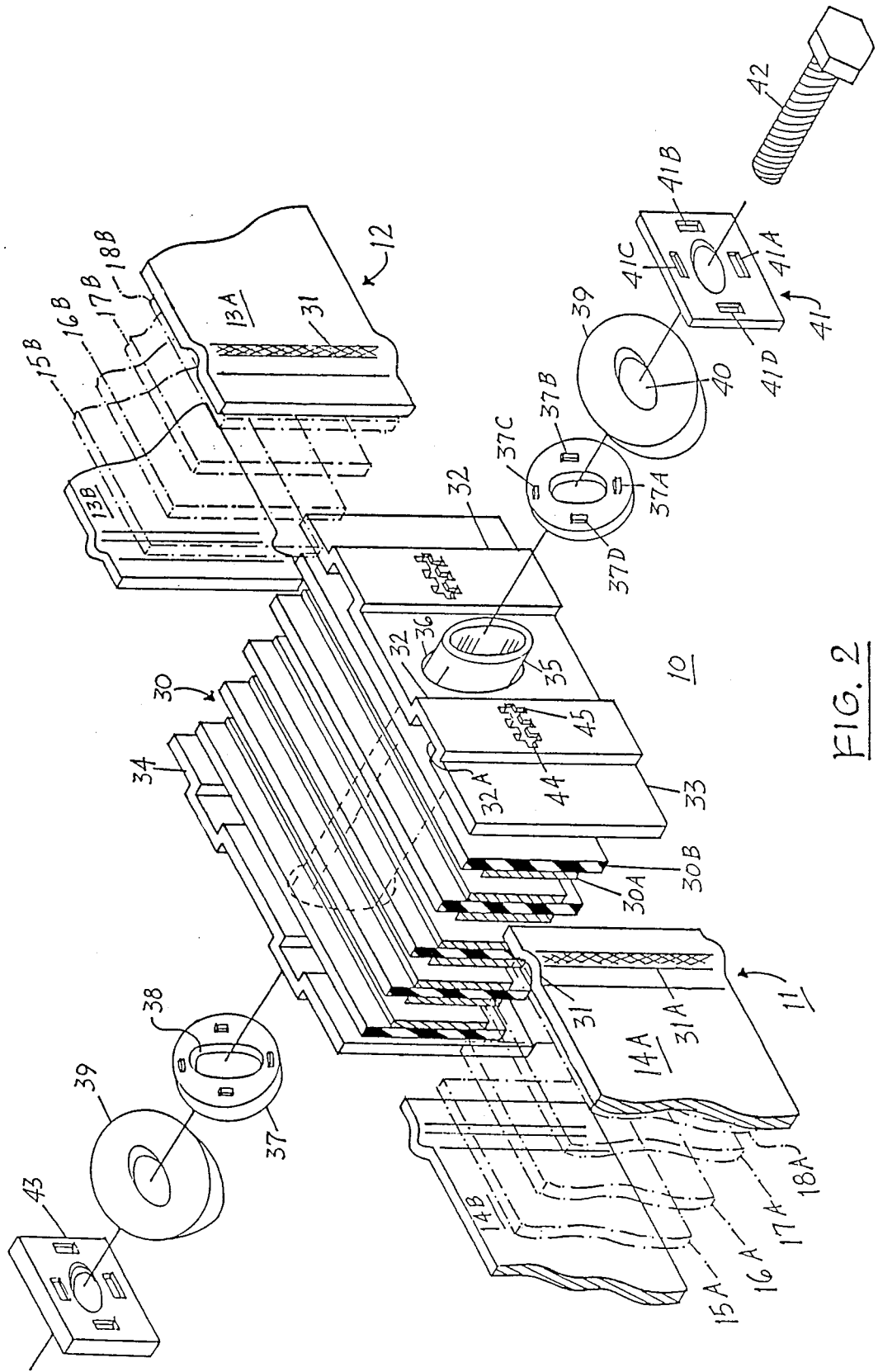
FIG. 2 is a top perspective view in partial section of the adjustable busway joint of FIG. 1 prior to connection with a pair of adjacent busway sections.

The busway joint and busway sections are interconnected in the manner best seen by referring now to FIG. 2 wherein a bus joint connector module 30 such as described within the aforementioned U.S. Pat. Application Ser. No. 193,000 is indicated. As described within this Application, alternating metallic splice plates 30A are interleaved between non-metallic insulating plates 30B for connecting with the adjoining bus bars. The oval tube 35 extending through the connector module exists through the joint side frames 33, 34 by means of oval-shaped slots 36. The bus bars 15A-18A, indicated in phantom within busway section 11 between side plates 14A, 14B, are arranged for interconnection with corresponding bus bars 15B-18B arranged between the side plates 13A, 13B in the adjacent busway section 12, as also indicated in phantom. To allow for relative movement between busway section 11, busway joint 10, a vertically extending rail 31 is integrally formed at the end of each of the side plates 14A, 14B which are received within channels 32 integrally formed within the busway joint side frames 33, 34. The width of the channel recess 32A is larger than the width of the vertically extending rail 31 to allow for relative motion therebetween. When the respective busway sections are positioned within the busway joint, the busway joint side frames 33, 34 are fastened to each other and to the connector module 30 by means of a thru-bolt 42, rectangular washer 41, Belville washer 39, by means of circular slot 40 and by means of a tabbed washer 37 which contains an oval slot 38. The busway joint side plates provide excellent electrical connection with the side plates of the respective busway sections to insure good ground continuity through the joint side plates. This is essential when the side plates of the busway system provide the necessary ground conduction as described, for example, in the aforementioned U.S. Pat. Application Ser. No. 122,863. Ground continuity through the bus joint is also provided by means of the top and bottom covers 20, 19 of FIG. 1 by means of the use of non-ferrous metals such as aluminum or copper for the top and bottom covers as well as the joint side plates 33, 34 as best seen in FIG. 2. The tabbed washer 37 is fitted over the protruding end of the oval tube 35 and the tabs 37A–37D are inserted within corresponding slots 41A–41D in the rectangular washer 41 to prevent the rectangular washer from rotating during attachment between the bus way joint and the busway sections. Similar tabbed washers 37, Belville washers 39 and rectangular washers 43 are provided on the opposite side of the busway joint except that the rectangular washer 43 is threaded to engage the thru-bolt 42. When the busway joint is fastened to the busway sections, the location of the rails 31 relative to the channels 32 is determined by viewing the vertically extending rail surface 31A through the viewing slot 44 formed within the channel 32. The tool access slots 45 that are formed along the edges of the viewing slot facilitate the entry of a levering tool, such as a screwdriver, for moving the rails 31 within the channels 32. The location of the rails 31 within the channels 32 within the busway joint 10 in FIG. 1 is readily indicated by means of the surface 31A which is coated with indicia to highlight the rails when seen from the exterior of the viewing slot 44.

Figure 3:
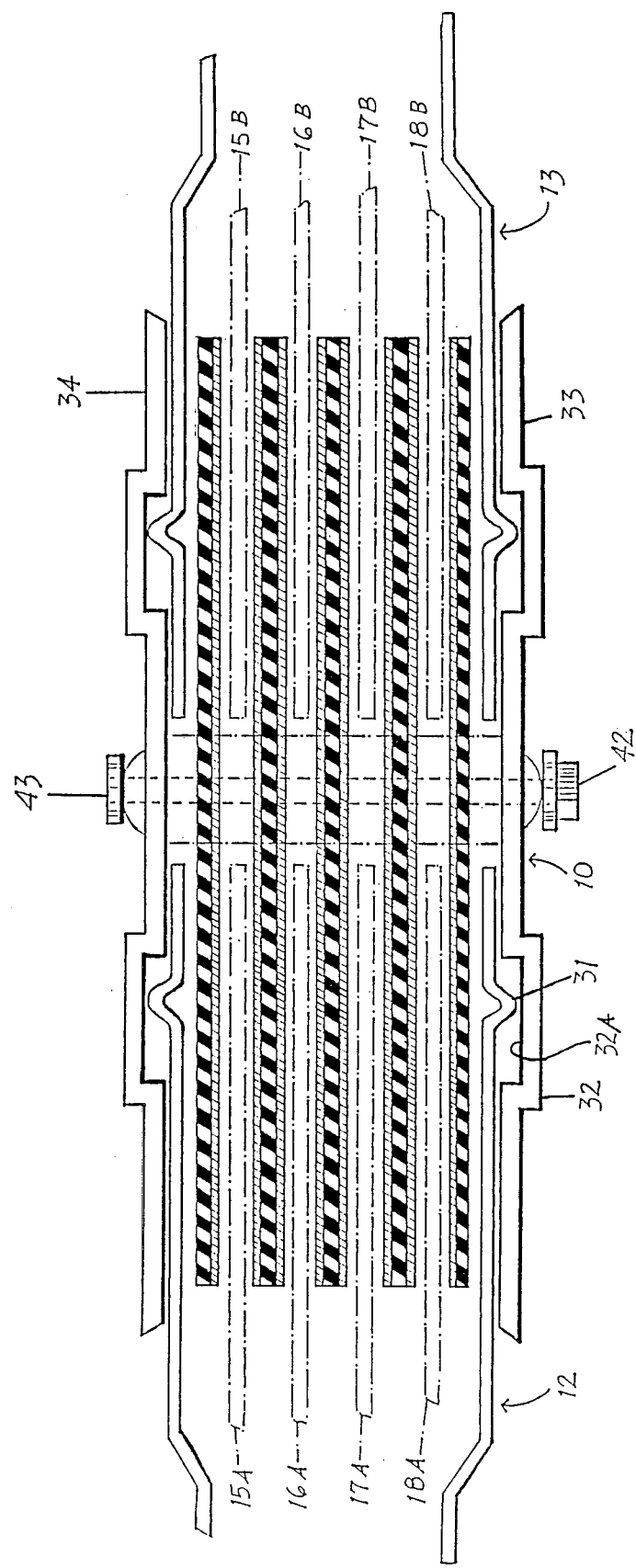
FIG. 3 is a plan view in partial section of the busway joint of FIG. 1 with the cover removed.

The assembled busway joint of FIG. 1 is depicted in FIG. 3 with the cover removed to show the location of the busway rails 31 within the bus joint channels 32 and to indicate the clearance provided within the bus joint channels by means of the width of the recesses 32A. Also indicated is the connection between the bus bars 15A–18A within the busway section 12 with the bus bars 15B–18B within busway section 13 through the connector module 30.

Figure 4:
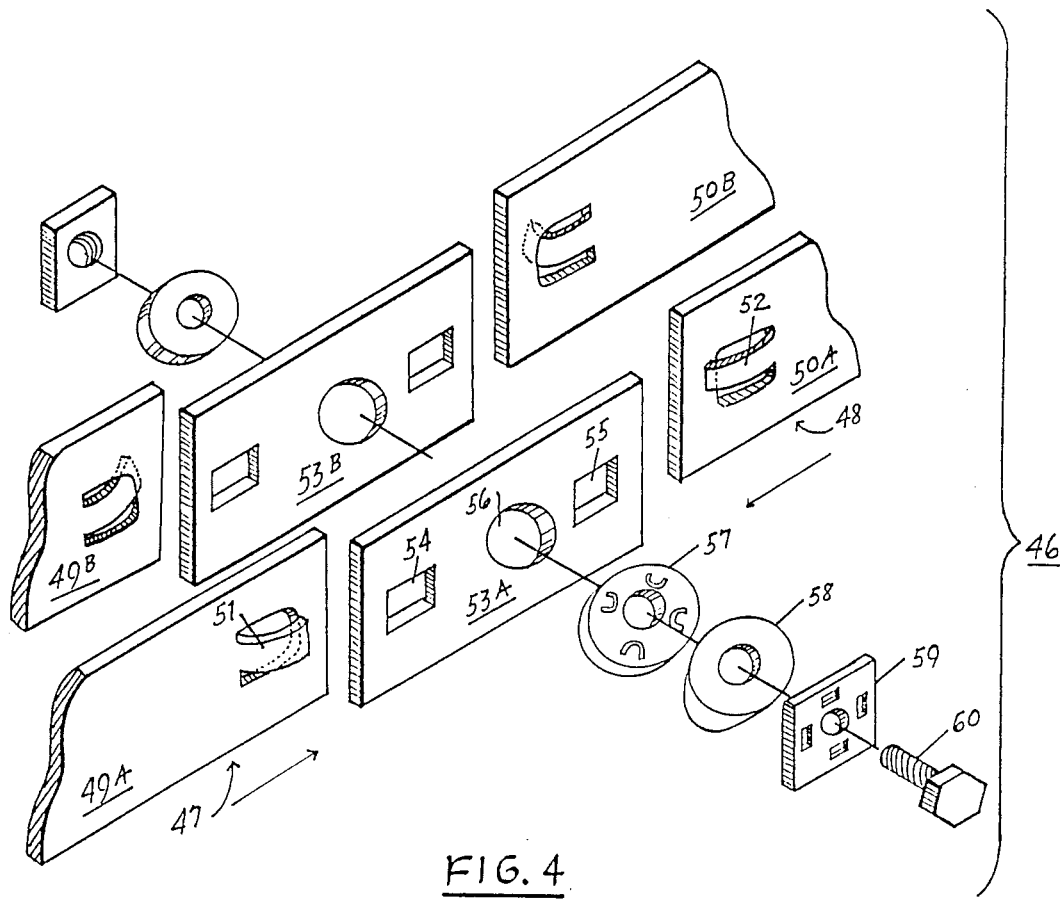
FIG. 4 is a front perspective view of an alternate embodiment of the adjustable bus joint according to the invention.

An alternate busway joint 46 is depicted in FIG. 4 with the connector module omitted and the bus bars within the adjoining busway sections 47, 48 all omitted for purposes of clarity. To provide for expansion with respect to the joint, a pair of tabs 51 are lanced within the side plates 49A, 49B and a similar pair of tabs 52 are lanced within the side plates 50A, 50B of the busway section 48. Complementary slots 54, 55 are formed on opposite ends of the busway joint 46 to receive the respective tabs when the busway sections are inserted within the ends of the busway joint. When the respective busway sections 47, 48 are inserted within the bus joint 46, attachment is made by means of the tabbed washer 57, Belville washer 58 and thru-bolt 60 in the same manner as described with respect to the embodiment depicted earlier with reference to FIG. 2.

Figure 4A:
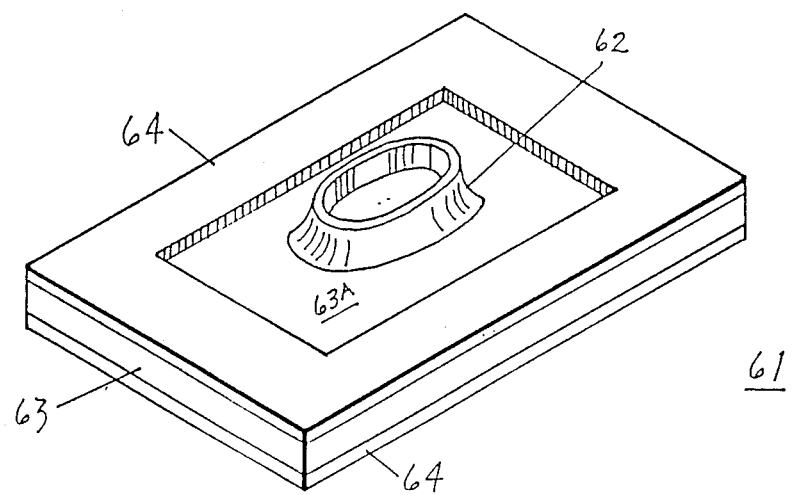
FIG. 4A is an alternate embodiment of a splice plate used within the bus joint of FIG. 4.

An alternate splice plate 61 is depicted in FIG. 4A which consists of a metal plate 63 with an insulative epoxy coating 64 applied to both sides thereof by a selective coating process which leaves a contact area 63A devoid of such coating. This splice plate accordingly does not require alternating insulating plates such as depicted at 30B in FIG. 2. A good description of the combined insulating-splice plate is found within the aforementioned U.S. Pat. Application Ser. No. 193,000.

It has thus been shown that a simple and efficient adjustable joint can be obtained by integrally formed channels integrally formed within the busway joints. Additionally, an indicator slot is provided in the busway joint to indicate the position of the busway rails therein.

Having thus described my invention, what I claim as new and desire to secure by Letters Patent is:

1. An electric busway joint comprising:
   a plurality of apertured metal splice plates and a plurality of apertured insulating non-metallic plates arranged within a pair of metallic side frames, said side frames each including a first channel therein and defining a first recess within an interior surface thereof;
   a first electric busway section adjacent one end of said metallic side frames;
   said splice plates being arranged for receiving bus bar conductors extending from a first end of said first adjacent electric busway section, said first adjacent electric busway section including a pair of first opposing side frames each of which includes first rails extending from an exterior surface thereof;
   whereby said first channels capture said first rails to allow relative motion between said first electric busway sections and said metallic side frames.

2. The electric busway joint of claim 1 including first slots through a part of said first channels for visual access to said first rails to indicate the location of said first rails.

3. The electric busway joint of claim 2 wherein first said rails are provided with an indicating coating to facilitate visual access to said first rails.

4. The electric busway joint of claim 1 wherein said metallic side frames extend along a longitudinal plane and wherein said first channels are arranged perpendicular to said longitudinal plane.

5. The electric busway joint of claim 1 including a second channel formed within said metallic side frames at an opposite end and defining a second recess within said interior surface.

6. The electric busway joint of claim 5 including a second electric busway section adjacent an opposite end of said metallic side frames said splice plates being arranged for receiving bus bar conductors extending from said second busway section, said second busway section including second rails extending from said exterior surface, whereby said second channels capture said second rails to allow relative motion between said second busway section and said metallic side frames.

7. The electric busway joint of claim 6 including second slots through a part of said second channels to indicate the location of said second rails within said second channels.

8. The electric busway joint of claim 1 including an insulating tube through said metallic splice plates and a thru-bolt through said insulating tube to fasten said metallic side frames to said splice plates.

9. The electric busway joint of claim 8 including a tabbed washer and a rectangular washer each arranged outboard said metallic side frames around said insulating tube.

10. The electric busway joint of claim 9 wherein said tabbed washer includes a plurality of upstanding tabs arranged around said insulating tube and received within slots formed within said rectangular washer to provide anti-turn facility to said rectangular washer.

11. An electric busway joint comprising:
   a plurality of apertured metal splice plates and a plurality of apertured insulating non-metallic plates arranged within a pair of metallic side frames, said side frames each including a first slot extending through a first end thereof;

a first electric busway section adjacent one end of said metallic side frames;

said splice plates being arranged for receiving bus bar conductors extending from said first adjacent electric busway section at a first end thereof, said first adjacent electric busway section including a pair of first opposing side frames each of which includes first tabs extending from an exterior surface thereof;

whereby said first slots capture said first tabs to allow relative motion between said first electric busway sections and said metallic side frames.

12. The electric busway joint of claim 11 including second slots formed therein at a second end opposite said first end.

13. The electric busway joint of claim 12 including a second adjacent electric busway section, said splice plates being arranged for receiving bus bar conductors extending from said second adjacent electric busway section at a second end opposite said first end, said second adjacent electric busway section including second tabs extending from an exterior surface thereof, whereby said second slots capture said second tabs to allow relative motion between said second busway section and said metallic side frames.

14. The electric busway joint of claim 13 including indicia means on said tabs to provide visual verification of the location of said first and second busway sections within said metallic side frames.

15. An electric busway joint comprising:

a plurality of apertured metal splice plates arranged within a pair of metallic side frames, said side frames each including a first slot extending through a first end thereof;

a first electric busway section adjacent one end of said metallic side frames;

said splice plates being arranged for receiving bus bar conductors extending from said first electric busway section at a first end thereof, said first electric busway section including a pair of first opposing side frames each of which includes first tabs extending from an exterior surface thereof;

whereby said first slots capture said first tabs to allow relative motion between said first electric busway section and said metallic side frames.

16. The electric busway joint of claim 15 including second slots formed therein at a second end opposite said first end.

17. The electric busway joint of claim 16 including a second electric busway section adjacent an opposite end of said metallic side frames, said splice plates being arranged for receiving bus bar conductors extending from said second electric busway section, and second tabs extending from an exterior surface of said second busway section thereof, whereby said second slots capture said second tabs to allow relative motion between said second busway section and said metallic side frames.

18. The electric busway joint of claim 15 including indicia means on said tabs to provide visual verification of the location of said first and second electric busway sections within said metallic side frames.

19. An electric busway joint comprising:

a plurality of apertured metal splice plates arranged within a pair of metallic side frames, said side frames each including a first channel therein and defining a first recess within an interior surface thereof;

a first electric busway section adjacent one end of said metallic side frames;

said splice plates being arranged for receiving bus bar conductors extending from said first busway section at a first end thereof, said first electric busway section including a pair of first opposing side frames each of which includes first rails extending from an exterior surface thereof;

whereby said first channels capture said first rails to allow relative motion between said first electric busway sections and said metallic side frames.

20. The electric busway joint of claim 19 including first slots through a part of said first channels for visual access to said first rails to indicate the location of said first rails.

21. The electric busway joint of claim 20 wherein said first rails are provided with an indicating coating to facilitate visual access to said first rails.

22. The electric busway joint of claim 21 wherein said metallic side frames extend along a longitudinal plane and wherein said first channels are arranged perpendicular to said longitudinal plane.

23. The electric busway joint of claim 19 including second channels formed therein at an opposite end thereof and defining second recesses within said interior surface.

24. The electric busway joint of claim 23 wherein said splice plates are arranged for receiving bus bar conductors extending from a second busway section at a second end opposite said first end, said second busway section including second rails extending from said exterior surface, whereby said second channels capture said second rails to allow relative motion between said second busway section and said metallic side frames.

25. The electric busway joint of claim 21 including second slots through a part of said second channels to indicate the location of said second rails within said second channels.

26. The electric busway joint of claim 19 including an insulating tube through said metallic splice plates and a thru-bolt through said insulating tube to fasten said metallic side frames to said splice plates.

27. The electric busway joint of claim 26 including a tabbed washer arranged outboard said metallic side frames around said insulating tube.

28. The electric busway joint of claim 27 wherein said tabbed washer includes a plurality of upstanding tabs arranged around said insulating tube and received within slots formed within a rectangular washer arranged on top of said tabbed washer to provide anti-turn facility to said rectangular washer.

29. The electric busway joint of claim 5 wherein said metallic side frames provide electrical continuity between said first and second busway sections.

30. The electric busway joint of claim 29 including a non-ferrous metal top cover and a non-ferrous metal bottom cover connecting between said first and second busway sections to provide further electrical continuity between said first and second busway sections.

* * * * *